(12) United States Patent
Kulyukin

(10) Patent No.: US 6,523,029 B1
(45) Date of Patent: Feb. 18, 2003

(54) SYSTEM AND METHOD FOR EMBEDDED INFORMATION RETRIEVAL IN A DISTRIBUTED FREE-TEXT APPLICATION ENVIRONMENT

(75) Inventor: Vladimir A. Kulyukin, Chicago, IL (US)

(73) Assignee: BitMobile Technologies, Hubbard Woods, IL (US)

( * ) Notice: Subject to any disclaimer, the term of this patent is extended or adjusted under 35 U.S.C. 154(b) by 0 days.

(21) Appl. No.: 09/534,472

(22) Filed: Mar. 24, 2000

(51) Int. Cl.⁷ .......................... G06F 17/30; G06F 17/27
(52) U.S. Cl. ...................... 707/5; 707/2; 707/3; 704/9
(58) Field of Search ...................... 707/1–8, 10; 704/9; 706/55

(56) References Cited

U.S. PATENT DOCUMENTS

| | | | | |
|---|---|---|---|---|
| 5,555,169 A | * | 9/1996 | Namba et al. | 704/9 |
| 5,625,814 A | * | 4/1997 | Luciw | 707/5 |
| 5,634,051 A | * | 5/1997 | Thomson | 707/5 |
| 5,794,050 A | * | 8/1998 | Dahlgren et al. | 395/708 |
| 5,895,464 A | * | 4/1999 | Bhandari et al. | 707/3 |
| 5,937,400 A | * | 8/1999 | Au | 706/55 |
| 5,946,499 A | * | 8/1999 | Saunders | 707/5 |
| 5,950,196 A | * | 9/1999 | Pyreddy et al. | 707/5 |
| 6,006,221 A | * | 12/1999 | Liddy et al. | 707/5 |
| 6,026,388 A | * | 2/2000 | Liddy et al. | 707/1 |
| 6,076,088 A | * | 6/2000 | Paik et al. | 707/5 |
| 6,078,914 A | * | 6/2000 | Redfern | 707/3 |
| 6,263,335 B1 | * | 7/2001 | Paik et al. | 707/5 |

OTHER PUBLICATIONS

Rao et al "System components for embedded information retrieval from multiple disparate information sources", ACM 1993, pp. 23–33.*

FAQ Finder: A Gateway to Usenet Newsgroups' Vladimir A. Kulyukin, 10 pages. No date.

Collaboration Across Boundaries: theories, strategies, and technology, by Vladimir A. Kulyukin, 1998, 16 pages.

Automating Content Integration with Autonomy, Analyst: Gerry Murray, 8 pages. No date.

Autonomy—Knowledge Management and New Media Content Solutions Autonomy Technology Whitepaper, dated Mar. 7, 2000, 8 pages.

Autonomy Knowledge Management and New Media Content Solutions, dated Mar. 6, 2000, 15 pages.

* cited by examiner

Primary Examiner—Safet Metjahic
Assistant Examiner—Uyen Le
(74) Attorney, Agent, or Firm—Brinks Hofer Gilson & Lione

(57) ABSTRACT

An embedded information retrieval system is provided including a free-text parser, a knowledge-based query generator, a distributed query dispatcher, and a persistent feedback retrieval manager. When the system is embedded in a text application, the free-text parser takes samples of the text supplied by the user and segments the samples into sentences. The sentences are ranked by their content. The top content-bearing sentences are supplied to the query generator to be converted into queries for the query dispatcher. For each query, the query dispatcher identifies the relevant distributed information sources, submits the query to them, and waits for retrievals. The retrievals are passed to the retrieval manager and saved locally. User feedback is used by the retrieval manager persistently and incrementally to improve retrieval accuracy.

17 Claims, 6 Drawing Sheets

Microfiche Appendix Included
(2 Microfiche, 157 Pages)

SYSTEM AND METHOD FOR EMBEDDED INFORMATION RETRIEVAL IN A DISTRIBUTED FREE-TEXT APPLICATION ENVIRONMENT

BACKGROUND OF THE INVENTION

The integration of document processing, query generation and user feedback continues to challenge information retrieval (IR) technologies. While search portals that are readily accessible on the Internet and corporate intranets remain among the most successful information retrieval applications, their ability to generate queries and utilize user feedback has some limitations. For example, these search portals typically require that users state their information needs in explicit queries. While this rigid protocol may benefit information technology professionals, lay users have difficulty formulating and satisfying their information needs through explicit queries.

In addition, the query processing mechanism is typically the same for all users, and does not allow fast and intuitive customization. Feedback is obtained through continuous solicitation of relevance judgments, which disrupts many users' information seeking behaviors and subsequently discourages them from either using the search portals or providing feedback. Even when provided, feedback is commonly utilized in the query space alone. Consequently, the search portals' behavior remains the same over multiple interactions.

While the search portals allow users to perform searches on different topics over the Internet, corporate intranets, and private databases, they neither support nor integrate with document processing. Thus, to perform a search relevant to the document at hand, users must disengage from document processing to use a different application. On the other hand, current text editing and word processing applications allow users to create documents about any topic or issue, but lack the means to integrate document creation with simultaneous retrieval of relevant information.

Therefore, what is lacking in the art is the integration of document processing, query generation and feedback in an application-embedded distributed IR system. The implementation of such a system for text processors would make IR transparent yet responsive to the needs of common computer users. What is needed is a non-intrusive, feedback-sensitive IR system that users can embed into their applications to tap into and monitor information sources while still engaged in routine usage of those applications. Such applications include text processing, spreadsheets and other commonly used software. The need for such a system is motivated by a growing number of information sources with a wealth of data, particularly over the Internet, but with few tools to timely and efficiently put the data to use.

SUMMARY OF THE INVENTION

In view of the above, a system and a method are presented for application-embedded information retrieval from distributed free-text information sources. An application's usage is sampled by an embedded IR system. Samples are converted into queries to distributed information sources. Retrieval is managed and adjusted through a user customized interface. The IR system is preferably embedded in a text processor.

A system for embedded distributed information retrieval includes a module for embedding a distributed information retrieval system in a computer application program. A free-text parser is coupled to the application program. The free-text parser is operative to receive scheduled reads of textual information from the application program, parse the textual information into sentences, and rank the sentences by their content-bearing capacities. A query engine is coupled to receive free-text sentences and generate structured queries in response thereto. The query engine includes a semantic network processor program, and is coupled to at least one knowledge base. A metasearch engine is coupled to receive and submit the structured queries to at least one information source. A retrieval manager is coupled to the metasearch engine. The retrieval manager receives the retrieved links associated with the structured queries, and ranks and filters the retrieved links based upon predefined criteria.

A method for generating structured queries in an embedded distributed information retrieval environment includes receiving scheduled reads of textual information, and parsing the textual information into sentences. The found sentences are ranked by their content-bearing capacities based on their terms, i.e., words and phrases. Structured queries are then generated using a semantic network processor program. The structured queries are submitted to at least one information source. Retrieved links associated with the structured queries are received. The retrieved links are ranked and filtered based upon predefined criteria.

The present invention accordingly provides the integration of document processing, query generation and feedback in an application-embedded distributed IR system. The presently preferred implementation is to embed such a system in a text processor application, but other application programs that include textual or numeric data can readily take advantage of the benefits of the invention. These benefits include a non-intrusive, feedback-sensitive IR system that users can use to automatically tap into information sources while still engaged in routine usage of the underlying application program. By automatically generating structured queries in the background, such a system allows periodic access to the growing number of information sources provided over the Internet, as well as on proprietary and intra-corporate data sources. The frequency of query generation and the relevance of retrieved information are controlled by the user to tailor the information retrieval process to the user's precise needs and desires.

These and other features and advantages of the invention will become apparent upon a review of the following detailed description of the presently preferred embodiments of the invention, when viewed in conjunction with the appended drawings.

DETAILED DESCRIPTION OF THE PRESENTLY PREFERRED EMBODIMENTS OF THE INVENTION

Figure 1:
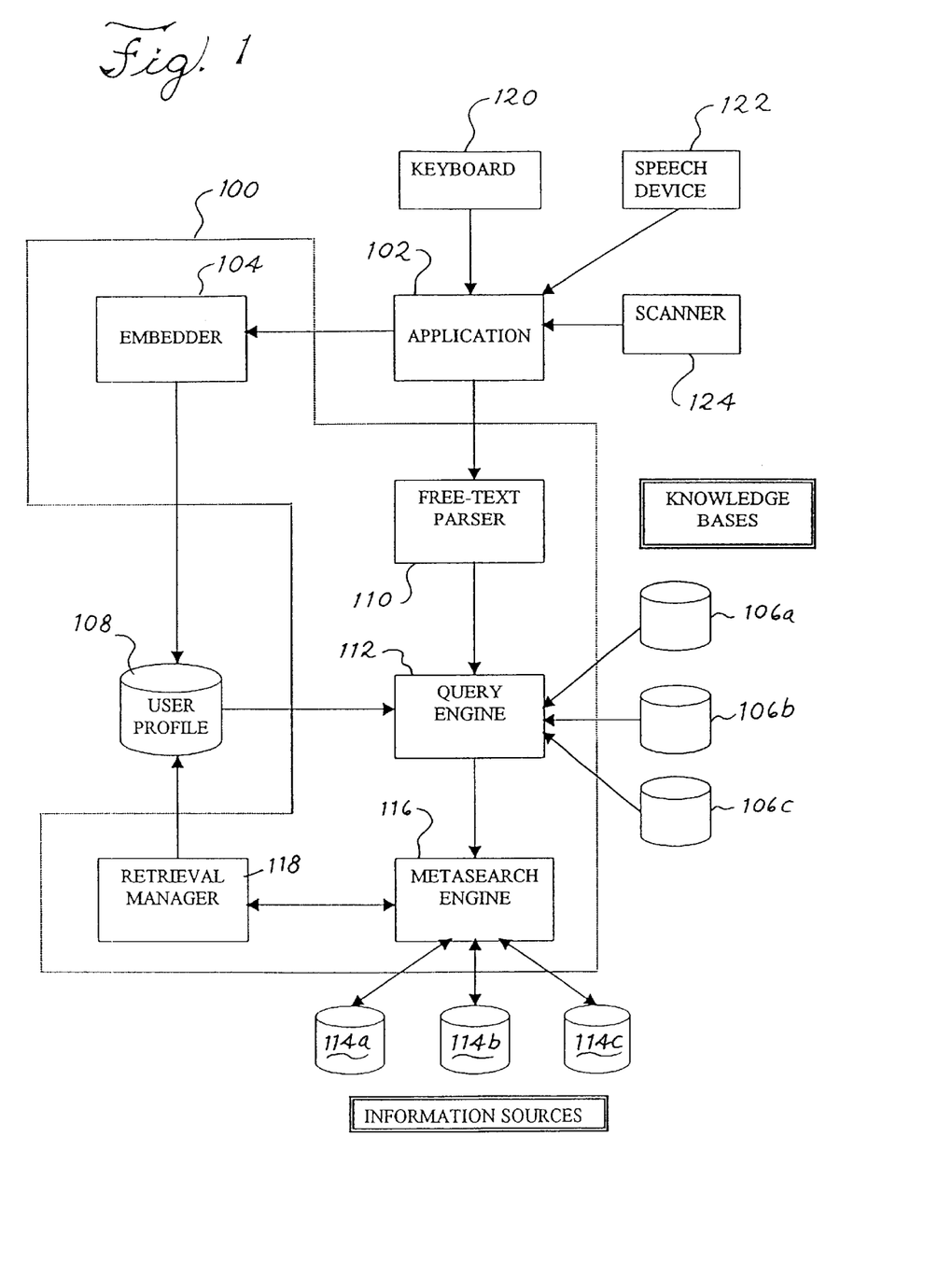
FIG. 1 is a system block diagram showing the embedded information retrieval system of the invention.

Reference is now made to the drawings, where FIG. 1 is a block diagram of a system 100 for embedded information retrieval in a distributed free-text application environment. The system 100 becomes embedded in an application 102 by the embedding module 104. The embedding happens through source subscription and knowledge base selection. During the source subscription stage, the user selects distributed sources from which information is to be retrieved. For example, the user selects public or private search portals. During the knowledge base selection stage, the user selects a knowledge base 106a–c on a specific area of expertise. A knowledge base is a semantic network of concepts organized in terms of abstraction and packaging relations. For example, a financial planner selects a knowledge base on mutual funds. The information specified by the user during the source subscription and knowledge base selection is stored in a user profile 108.

In the preferred embodiment of the invention, the application 102 in which the system 100 becomes embedded is any application that allows the user to enter free text through keyboard 120 or voice, e.g., text editors or text editors coupled with speech input and speech recognition devices 122. Input data to the system 100 comes from existing free-text documents, or may come simultaneously as the documents or files are being created or dictated. A free-text parser 110 takes samples of incoming free text on a schedule preferably specified by the user. The schedule can be, for example, every one or five minutes or as much as hourly, daily, weekly, monthly, etc. The user also specifies whether the samples are taken from the existing documents, or simultaneously as the documents are being created. In an alternate embodiment, input data can be scanned into the system 100 through a scanner device 124 and processed as described above.

The free-text samples are segmented by the free-text parser 110 into sentences through a pattern-matching process based on regular expressions. A percentile of the found sentences are selected for query generation, and are passed to the query engine 112. The selection of sentences may be done in one of two ways. Preferably, sentences are ranked by their content-bearing capacities, and the top percentile of the ranked sentences are chosen. The preferred content-bearing ranking of the sentences occurs as follows. The sentences are segmented into terms, i.e., words and phrases. Each found term is assigned an importance weight based on the term's distribution pattern in all of the found sentences. The rank of a sentence is computed from the weights of its terms. In the preferred embodiment of the invention, the found sentences are ranked by their content-bearing capacities, and the top percentile of the ranked sentences are selected for query generation. Alternatively, sentences may be selected randomly. A more detailed description of the text segmentation and weighting processes is provided below in connection with FIGS. 2–3

The selected sentences are passed to the query engine 112. From each received sentence, the query engine 112 generates queries for the subscribed information sources 114a–c by using a semantic network processor program located in the query engine 112, and the knowledge bases 106a–c specified by the user. The terms of each sentence are input into the semantic network processor program. The semantic network processor program spreads activation from the inputs to the nodes of the knowledge bases 106a–c. The activated nodes invoke callback procedures associated with them to generate queries from the inputs that caused their activation. Each callback procedure thus preferably generates syntactically correct queries for a specific information source. The semantic network program and its callback procedures therefore translate free-text inputs to the query languages of the information sources 114a–c selected by the user. A more detailed description of the process of generating queries is provided below in connection with FIG. 4. A detailed description of one presently preferred semantic network program is also provided below.

The queries generated by the query engine 112 are passed to the metasearch engine 116. The metasearch engine 116 submits each query to the appropriate information sources 114a–c. Each query is submitted only to those sources in whose language it is formulated. As those skilled in the art will appreciate, while FIG. 1 depicts only three information sources 114a–c for the sake of clarity and simplicity, the number of information sources can be substantially larger. In the preferred embodiment of the invention, the information sources 114a–c are public search portals, such as AltaVista, Excite, Infoseek, Lycos, or Yahoo, or private search portals deployed on corporate intranets and local area networks.

Before dispatching a query to a source, the metasearch engine 116 verifies that the query is syntactically correct. If the syntax of the query is valid, the metasearch engine 116 verifies that the query is appropriate for the particular information source 114a–c. The verification of query appropriateness is based on two factors: the source descriptions and the user evaluations from the user profile 108. The source descriptions preferably specify the type of information obtainable from the information sources 114a–c, any timeout intervals, and communication protocols used by the information sources 114a–c. The timeout interval specifies a user programmed time interval that elapses from the submission of a query to the reception of retrievals before the system 100 assumes that the source has not responded. The timeout intervals are specified by the user through the embedding module 104. For example, the user can elect to wait for responses from the source 114a–c for as little as several seconds or as long as several hours, days, weeks, months, etc.

The communication between the metasearch engine 116 and the information sources 114a–c is based on distributed networking protocols such as HTTP, COM, and CORBA. A query is dispatched to an information source 114a–c if it matches the information source's description, and is consistent with previous user evaluations. User evaluations of previous retrievals from each source are kept in the user profile 108, and can be obtained from a retrieval manager 118 on demand. After the query is dispatched, the metasearch engine 116 waits for an appropriate timeout. If the timeout elapses before the reception of retrievals, it is assumed that no retrievals were provided. Otherwise, the retrievals received from the information source 114a–c are passed to the retrieval manager 118. Each retrieval preferably specifies the source, the query, and the responses returned after the query was submitted.

Upon reception of the retrievals, the retrieval manager 118 integrates the retrievals with the retrievals stored in the user profile 108. The integration preferably allows all of the retrievals to be viewable by the user on demand. The user inspects the retrievals at his or her convenience and through the retrieval manager 118 provides voluntary feedback on the relevance of each retrieval. User feedback is saved in the user profile 108, and is also provided on demand to the metasearch engine 116. The retrieval manager 118 preferably partitions user feedback into two spaces: global and local. The global space contains user preferences and evaluations that are true of all sources and all free-text inputs handled by the system 100. The local space contains user preferences and evaluations that are true of a subset of all information sources and a subset of all free-text inputs. For example, the user may elect to exclude a particular information source 114a–c from returning retrievals with respect to a particular document. A more detailed description of the retrieval management process is provided below in connection with FIG. 6.

In the preferred embodiment of the invention, the application 102, embedder 104, free-text parser 110, query engine 112, user profile 108, metasearch engine 116 and retrieval manager 118 either reside on one computer, or are distributed across a network of computers. The information sources 114a–c and knowledge bases 106a–c are preferably distributed across a network of computers.

Figure 2:
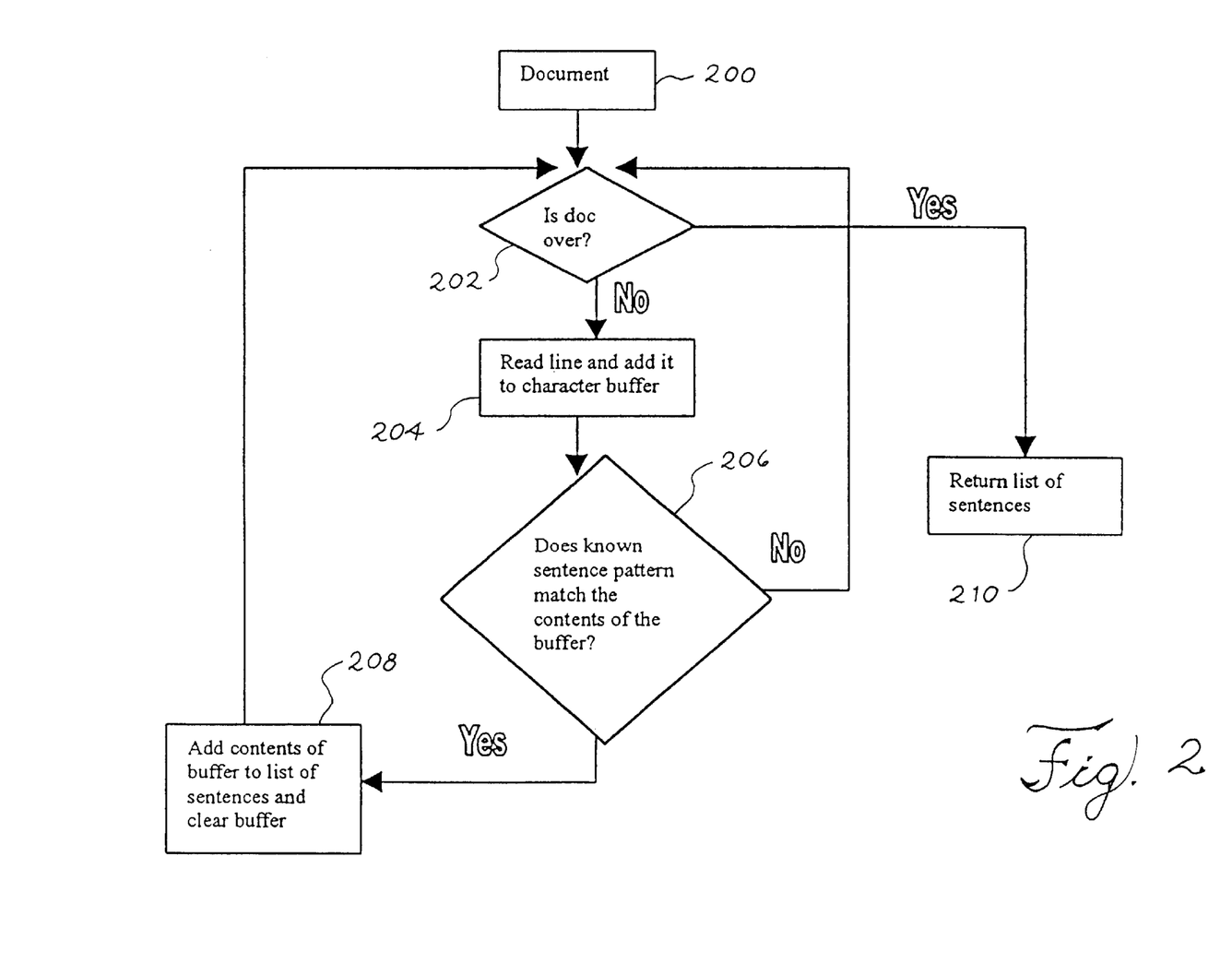
FIG. 2 is a flow chart showing one presently preferred text segmentation process.

Referring now to FIG. 2, one presently preferred text segmentation process is described. Starting with the document 200, a test is performed at step 202 to determine if additional text is present that needs to be evaluated. If additional text exists, a new line of text is read from the input document 200 at step 204 and it is added to a character buffer. A second test is performed at step 206 to determine whether a known sentence pattern matches the contents of the character buffer. If the contents of the character buffer does not match, the sentence pattern is added at step 208 to the list of sentences being compiled for the document 200, and the character buffer is cleared. If a match does exist, the test simply branches back to determine if further text exists in the document 200 that needs to be evaluated at step 202. Once analysis of the document is complete, a list of sentences is returned from the text segmentation subroutine at step 210.

Figure 3:
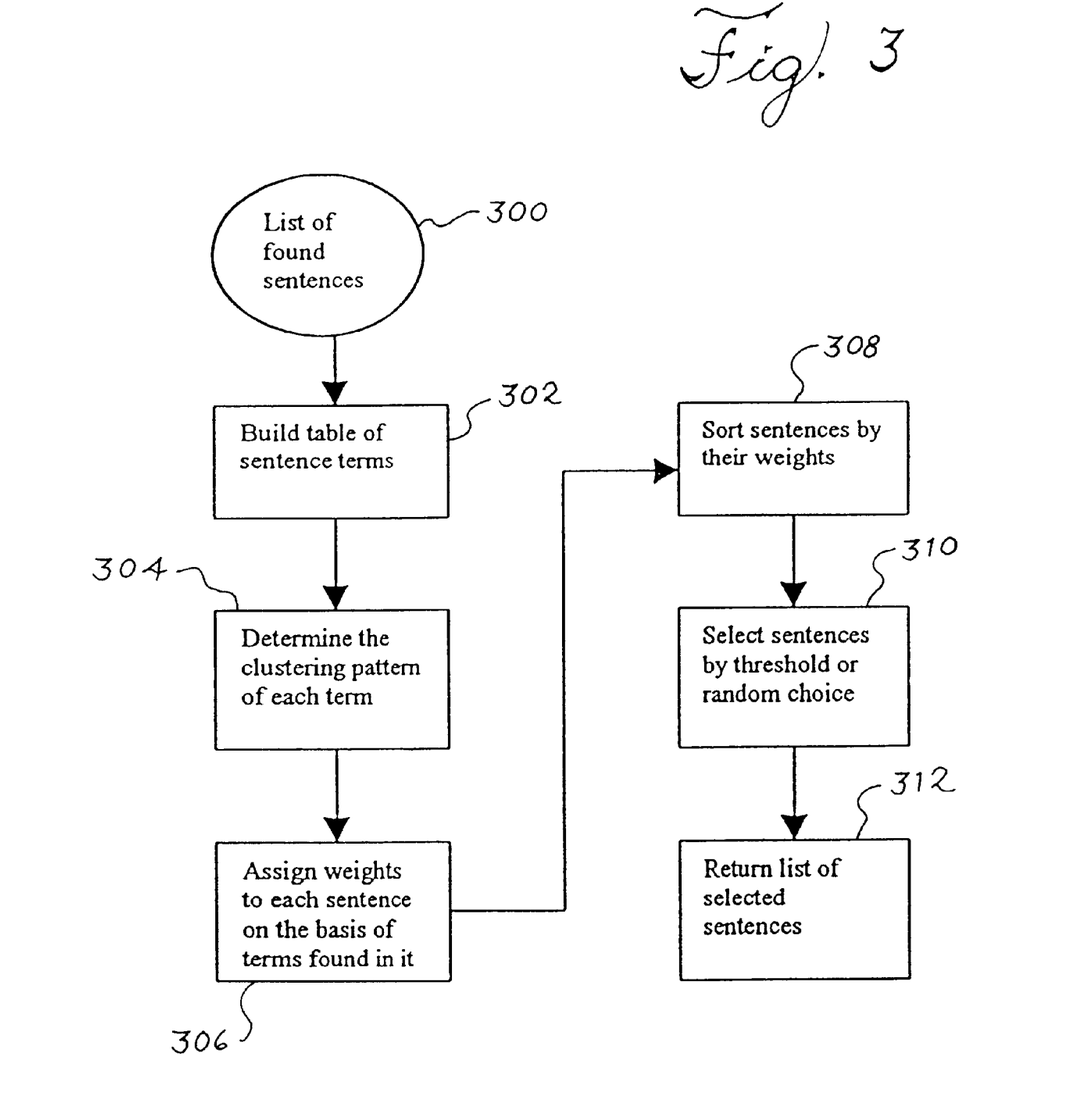
FIG. 3 is a flow chart showing one presently preferred weight assignment process.

One presently preferred process of assigning weights to the list of sentences returned from the text segmentation subroutine is provided in FIG. 3. Referring to FIG. 3, the list of retrieved sentences is input to the weight assigning subroutine at step 300. At step 302, a table is built of sentence terms from the list of sentences received. Next, the weight assignment subroutine determines the weight of each term in the table at step 304.

A term's weight preferably unifies two approaches: inverse document frequency (IDF) and condensation clustering (CC). IDF values a term's rarity in the set of sentences found in the document 200; CC values terms' non-random distribution patterns over the sentences of the document 200.

The mathematical model is as follows. Let D be the total number of sentences. Define f(i, j) to be $t_i$'s frequency in the j-th sentence $d_j$. Put $\tilde{n}_j=1$ if f(i, j)>0, and 0, otherwise. Put $D_i=\Sigma_{i=1}^{D}\tilde{n}_j$. For $t_i$'s IDF-weight, put $T_{idf}(i)=A_{idf}+\log(D/D_i)$, with $A_{idf}$ a constant. For $t_i$'s tfidf weight in $d_j$, put $T_{tfidf}(i, j)=f(i, j)(A_{idf}+\log(D/D_i))$. The CC-weight of $t_i$ is the ratio of the actual number of sentences containing at least one occurrence of $t_i$ over the expected number of such sentences: $T_{cc}(i)=A_{cc}+\log(E(\tilde{D}_i)/D_i)$, where $A_{cc}$ is a constant and $\tilde{D}_i$ is a random variable assuming $D_i$'s values. Put $T_i=\Sigma_{j=1}^{D}f(i, j)$. Since $\tilde{n}_i$ assumes 1 and 0 with the respective probabilities of $p_i$ and $q_i=1-p_i$, $E(\tilde{n}_i)=p_i=1-(1-1/D)^{T_i}$. Since $\tilde{D}_i=\Sigma_{i=1}^{D}\tilde{n}_i$, $E(\tilde{D}_i)=Dp_i$. For $t_i$'s tfcc weight in $d_j$, put $T_{tfcc}(i, j)=f(i, j)T_{cc}(i)$. Let $A_{cc}=A_{idf}$. By definition, $T_{cc}(i)=T_{idf}(i)+\log p_i$. Hence, the lemma: If $A_{cc}=A_{idf}$, $T_{cc}(i)=T_{idf}(i)+\log p_i$.

A class of metrics obtains, unifying IDF and CC: $T_{idfcc}(i)=A+BT_{idf}(i)+C\log p_i$, where A, B, and C are constants. If $A=A_{idf}$, B=1, and C=0, $T_{idfcc}=T_{idf}$; if $A=A_{cc}$, B=1, and C=1, $T_{idfcc}=T_{cc}$. Since f(i, j) approximates the importance of $t_i$ in $d_j$, $t_i$'s weight in $d_j$ is given by $T_{tfidfcc}(i, j)=f(i, j)T_{idfcc}(i)$.

Weights obtained from the weight assignment subroutine are used to compute the weight of each sentence, and the sentences are next sorted by their weights at step 308. Sentences are then selected by a predetermined threshold or random choice at step 310. In the preferred embodiment of the invention, as mentioned above, the threshold method is employed using a threshold of preferably the top 10%, but the threshold can be preferably modified by the user in the user profile 108 (FIG. 1). A list of selected sentences is then returned from the weight assigning subroutine at step 312.

Figure 4:
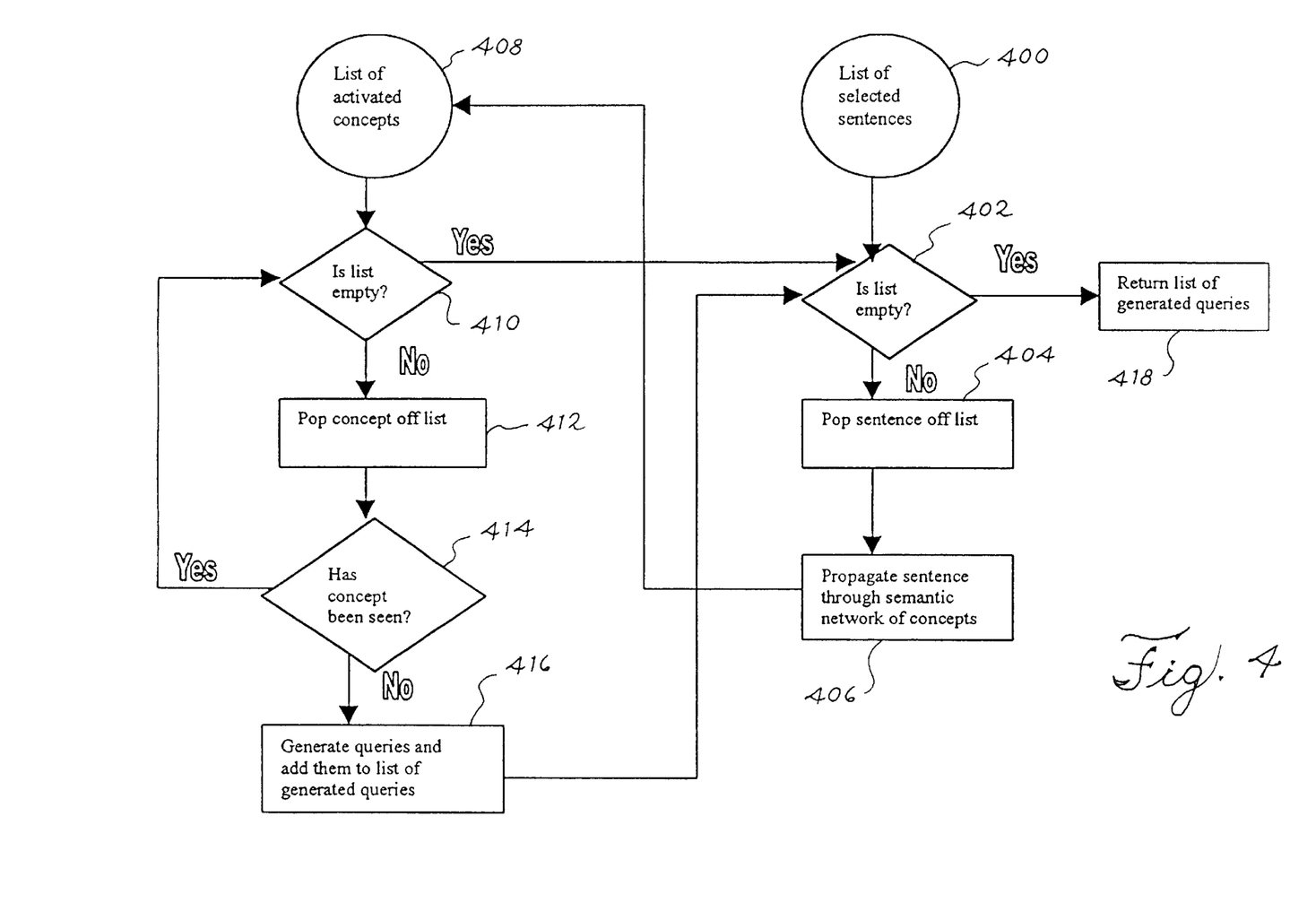
FIG. 4 is a flow chart showing one presently preferred method of automatic query generation.

As described above, the returned list of selected sentences is used to generate the queries that are dispatched to the information sources 114a–c. One presently preferred embodiment of the process for generating queries is shown in FIG. 4. The list of selected sentences is received by the query generating subroutine at step 400, and a test to determine whether the list is empty is performed at step 402. So long as sentences remain on the list, the next sentence from the top of the list is selected at step 404, and that sentence is propagated through a semantic network of concepts at step 406. A detailed description of one presently preferred semantic network format and associated listing for use with the invention is provided below.

A list of activated concepts is identified at step 408 and a test is performed at step 410 to determine if the list is empty or not. If the list is empty, the subroutine returns back to step 402 to determine if another selected sentence exists. If the activated concept list is not empty, the first concept is taken off the list at step 412 and a test is performed at step 414 to determine if the concept has been identified before. If so, the subroutine moves back to step 410 for another activated concept. If the concept has not been seen, a query is generated for the concept, which is added to a list of generated queries at step 416. Afterwards, the subroutine branches back to step 402 for additional selected sentences. Once the list of selected sentences 400 is depleted, the query generation subroutine returns a list of generated queries at step 418.

In the preferred embodiment of the invention, a metasearch engine 116 (FIG. 1) is used to take the list of generated queries and dispatch the queries to the appropriate information source 114a–c. One presently preferred embodiment of the metasearch engine is shown in connection with FIG. 5.

Figure 5:
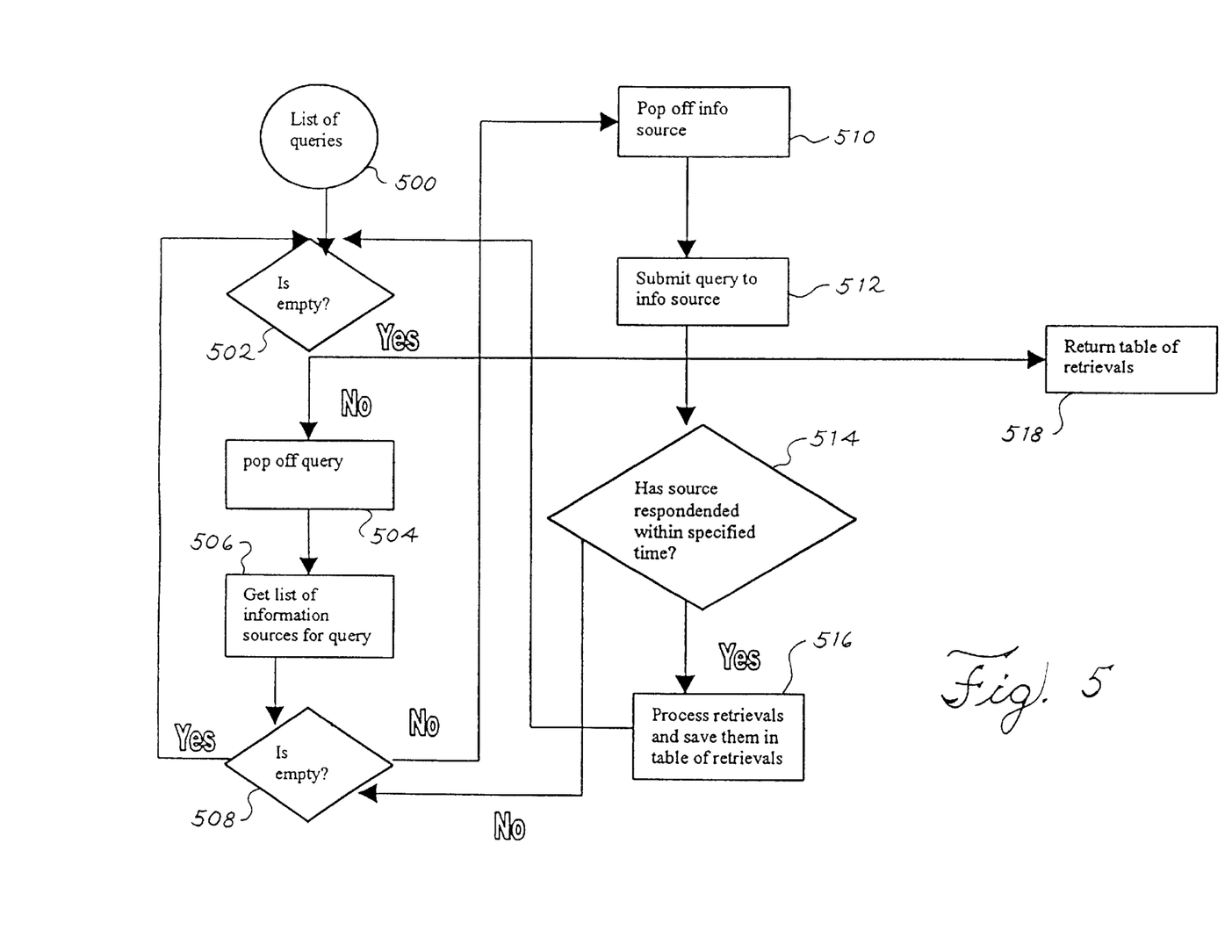
FIG. 5 is a flow chart showing one presently preferred metasearch engine.

Referring to FIG. 5, the list of generated queries is received by the metasearch subroutine at step 500. A test is performed initially at step 502 to determine if additional queries remain on the list. If so, the next query is taken off the list at step 504 and a list of relevant information sources 114a–c is obtained at step 506. If the list of relevant information sources 114a–c is empty, as determined at step 508, the metasearch subroutine branches back to step 502. If not, the query is submitted to each information source 114a–c on the list at step 512. The metasearch subroutine then waits at step 514 for the pre-established wait interval to receive a response from the respective information source 114a–c. If a timeout occurs and no information was retrieved, as described above, the metasearch subroutine branches back to step 508. If information was retrieved within the pre-established time period, the information retrieved is saved in a table and processed at step 516. The metasearch subroutine then branches back to step 502 for any additional queries. If no queries remain on the list of generated queries, the metasearch subroutine returns the table of the retrieved information at step 518. The returned table maps each information source 114a–c to its retrievals.

Figure 6:
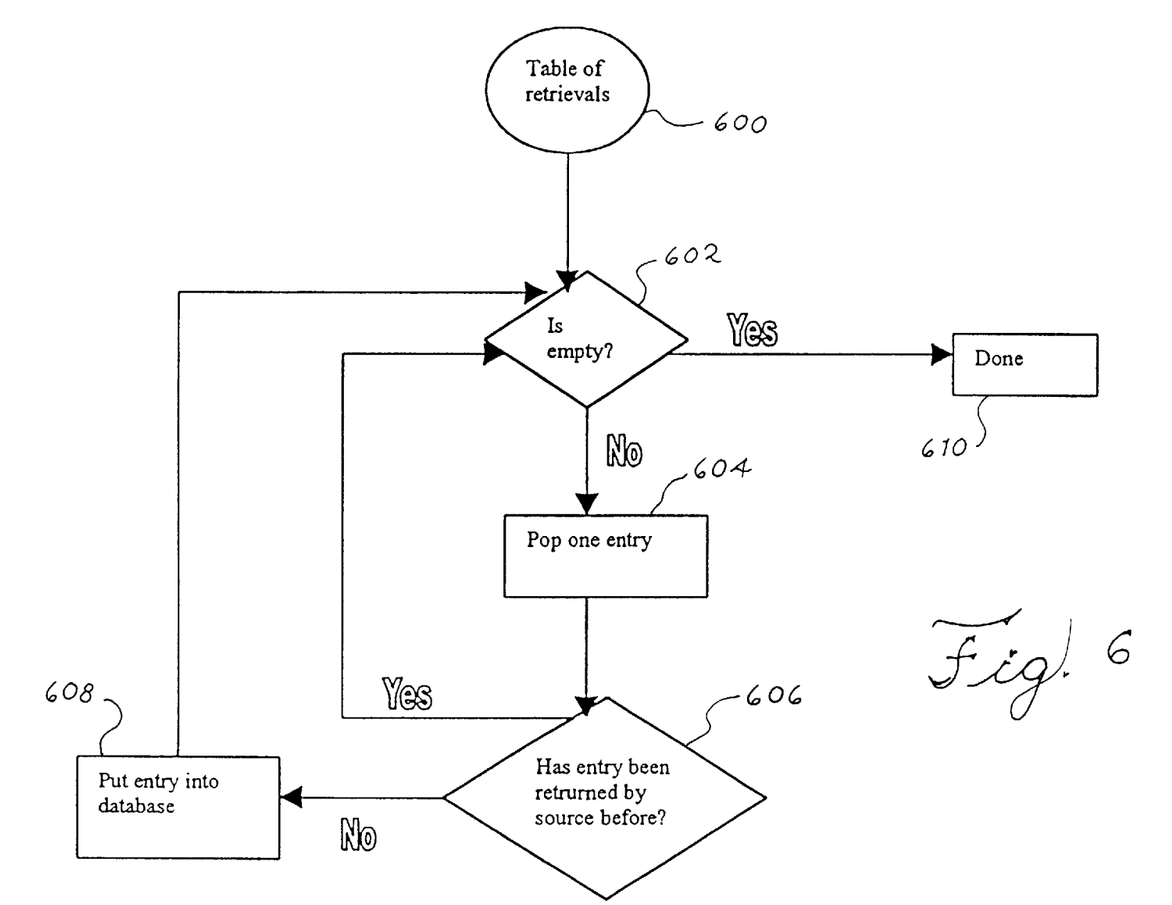
FIG. 6 is a flow chart showing one presently preferred retrieval manager process.

The information retrieved from the queries is processed by the retrieval manager 118 shown in FIG. 1. One presently preferred process for managing the retrievals is shown in FIG. 6. Referring to FIG. 6, the table of retrievals is received at step 600 by the retrieval manager subroutine. A test is initially performed at step 602 to determine if the table is empty. If not, the next entry is taken at step 604, and a test is performed at step 606 to see if the particular entry has been returned by this information source 114a–c before. If so, the subroutine branches back to step 602. If not, the particular entry in the table of retrievals 600 is entered into a database at step 608. In this manner, the retrieval manager subroutine processes all of the retrievals in the table 600 until no more retrievals exist, and the subroutine exits at step 610.

The presently preferred computer program listing for implementing the above methods and functions is included in the Microfiche Appendix. This program is written in the Common Lisp Object System (CLOS) programming language and the JAVA programming language. As those skilled in the art will appreciate, however, the methods and functions described herein can be implemented in any number of common computer programming languages without departing from the essential spirit and scope of the invention.

Operation of the preferred embodiment of the invention is best illustrated with the following example where X is a computer science researcher working on a grant proposal on intelligent networking protocols. Due to intensive competition and rapidly approaching deadlines, it is vital that X keep abreast of the most recent developments in the field. While X knows many relevant information sources, X cannot take full advantage of them because of their size, dynamic nature, and lack of adequate search tools. Once embedded in X's word processor, X can employ the embedded information retrieval system 100 to generate automatic queries from the text of X's grant proposal in the background, submit those queries to relevant information sources 114a–c, and save the received retrievals locally. Then, X can inspect the found retrievals when convenient and provide feedback on their quality and relevance. Since the system 100 operates in the background, the retrieval of relevant information occurs as a by-product of X's routine document creation.

The above example is easily generalized to other user populations, e.g., attorneys, newspaper reporters, technical writers, etc., who need relevant information to come to their desktops without disrupting their routine document creation activities. Additionally, the system can also be embedded in other application programs besides word processors, such as spreadsheet and database programs, to name just a few.

A detailed description of one presently preferred semantic network that can be used with the systems and methods described above is provided below.

Let R and N denote reals and naturals, respectively. All subscripts are in N, unless otherwise specified. If S is a set, $2^S$ denotes its power set, i.e., the set of all subsets of S, and $|S|$ denotes its cardinality. The subset relationship is denoted by $\subseteq$. The logical if is denoted by $\rightarrow$; the logical if and only if is denoted by $\Leftrightarrow$ or iff. If V is a vector space, dim(V) denotes the dimension of V. For example, if V is a plane, dim(V)=2.

Elements forming a sequence are written inside a pair of matching square brackets $[e_0, \ldots, e_n]$. The empty sequence is written as [ ]. Elements forming a set are written inside curly braces: $\{e_0, \ldots, e_n\}$. The empty set is written as { } or $\emptyset$. Elements forming a vector are written inside angular brackets: $<e_0, \ldots, e_n>$. For example, [0,1,2], {0,1,2}, <0,1,2> denote a sequence, a set, and a vector, respectively.

If v is a variable, $\{v\}$, $[v]$, $\vec{v}$, v denote that v is a set, a sequence, a vector, and an element, respectively. For example, $\{v\}=\{0,1,2\}$; $[v]=[0,1,2]$; $\vec{v}=<0,1,2>$; v=1. Furthermore, $\{v_i\}$ denotes a set of one element $v_i$; $\{v\}_i$ denotes the i-th set of elements; $[v_i]$ denotes a sequence with one element $v_i$; $[v]_i$ denotes the i-th sequence of elements. If S is a set, [S] is the set of all possible sequences over S. For example, [R] is the set of all sequences of reals.

The functions head and tail return the first element and the rest of the elements in a sequence respectively, that is, head([ ])=[ ], head($[e_0, e_1, \ldots, e_n]$)=$e_0$, tail([ ])=tail($[e_0]$)= [ ], tail($[e_0, e_1, \ldots, e_n]$)=$[e_1, \ldots, e_n]$. The function conc concatenates its first argument to its second argument. For example, conc(v,$[e_0, \ldots, e_n]$)=$[v, e_0, \ldots, e_n]$, conc($[v]$, $[e_0, \ldots, e_n]$)=$[[v], e_0, \ldots, e_n]$, and conc($[v]$, [ ])=$[[v]]$. The function apnd is defined by apnd($[v]$, $[w]$)=$[e_0^v, \ldots, e_m^v, e_0^w, \ldots, e_m^{w]}$, $m \geq 0$, $[v]=[e_0^v, \ldots, e_m^v]$, $3[w]=[e_0^w, \ldots, e_n^w]$, apnd([ ], $[v]$)=$[v]$, apnd($[v]$, [ ])=$[v]$. If $[S]_0, [S]_1, \ldots, [S]_n$ are sequences, $\Sigma_{i=0}^n [S]_i$=apnd($[S]_0$, apnd($[S]_1, \ldots,$ apnd($[S]_{n-1}, [S]_n) \ldots$)) A sequence $[S]_1$ completes a sequence $[S]_2$ iff $[S]_2=[e_0, \ldots e_n]$ and $S_1=[e_0]+[v]_0+[e_1]+[v]_1+\ldots +[e_n]+[v]_n$, where $[v]_i$, $0 \leq i \leq n$, is a subsequence of $S_1$. For example, if $[S]_1=[e_0, e_1, e_2, e_3]$, $[S]_2=[e_0, e_2]$, and $[S]_3=[e_2, e_1]$, $[S]_1$ completes $[S]_2$, but does not complete $[S]_3$. Any sequence completes [ ].

An object is a 2-tuple $[o_i, R_{oi}]$, where $o_i \in I=\{O_j | j \in N\}$ is the object's unique id, and $r_i$ is the object's set of representations. The definition of representation depends on specific retrieval tasks. For example, objects can be represented as vectors of reals or as nodes in a semantic network. A retrieval model M operates in a universe of objects. The universe is the set of all objects, and is denoted by $\Omega$. M's primitives are called tokens. The definition of token depends on the context. For example, tokens can be keywords, keyword collocations, or nodes in a semantic network. The set of all possible tokens is denoted by T. M's representation function is a bijection $\lambda$: $I \times 2^T \rightarrow R$, where R is M's set of representations. The finite set of objects retrievable by M is denoted by $\Lambda \subset \Omega$. Formally, $\Lambda=\{[o_i, \{r\}] | \lambda(o_i, T)=r\}$. Since the second element of every object in $\Lambda$ is a singleton, i.e., a set of one element, the set notation is dropped for the sake of simplicity. Thus, $\Lambda=\{[o_i, \{r\}] | \lambda(o_i, T)=r\}$. While an object's id is unique in the universe, the object's representation is unique only within a model. Two different models may represent the same object differently. However, since the representation function is a bijection, the object's representation is unique within a model.

Let $\Lambda_I=\{o_i | [o_i, r_i] \in \Lambda\}$. Since there is a bijection between $\Lambda$ and $\Lambda_I$, when the context permits, $\Lambda$ and $\Lambda_I$ are used interchangeably and the objects are referred to by their ids, i.e., the elements of $\Lambda_I$. The token weight function $\omega$: $I \times T \rightarrow R$ assigns weights to tokens in objects. The object similarity function $\sigma$: $\Omega \times \Omega \rightarrow R$ computes the similarity between two objects in $\Omega$. The rank function $\rho$: $:\Omega \times \Omega \rightarrow N$ imposes an ordering on $\Lambda$'s objects. The rank of $o_i \in \Lambda$ with respect to $o_q \in \Omega$ is denoted by $\rho(o_i, o_q)=\chi \in N$, then $(\forall o_k \in \Lambda)$ $\{\{\rho(o_k, o_q)<\chi\} \Leftrightarrow \{\sigma(o_k, o_q)>\sigma(o_i, o_q)\} \vee \{\sigma(o_k, o_q)=\sigma(o_i, o_q) \wedge k<i\}\}$, and $(\forall o_j \in \Lambda)$ $\{\{\rho(o_j, o_q)>\chi\} \Leftrightarrow \{\sigma(o_j, o_q)<\sigma(o_i, o_q)\} \vee \{\sigma(o_j, o_q)=\sigma(o_i, o_q) \wedge i<j\}$. Thus, the ranking of objects is determined by a and their initial ordering in $\Lambda$. Formally, $M=[\Omega, \Lambda, T, \lambda, \omega, \sigma, \rho]$.

N-ary relations on objects are represented as n-dimensional bit arrays. For example, a binary relation is represented as a matrix whose rows and columns are objects and whose entries are 0's and 1's, depending on whether the relation holds between a given pair of objects.

A retrieval sequence returned by M in response to $o_q \in \Omega$ is denoted by $M(o_q)$, and is a permutation $[o_{\pi(1)},$ $o_{\pi(2)}, \ldots, o_{\pi(n)}]$ of the ids of objects in $\Delta$ such that $\pi(i)<\pi(j) \Leftrightarrow p(o_i, o_q)<p(o_j, o_q)$. Let $M_O=[\Lambda_0, T, \lambda_0, \omega_0, \sigma_0, p_0]$ and $M_1=[\Lambda_0, T, \lambda_1, \omega_1, \sigma_1, p_1]$. $M_0$ and $M_1$ are equivalent under ranked retrieval ($M_0\equiv_{\Pi}M_1$) iff $\Lambda_0=\{[o_0, \lambda_0, (o_0, T)], \ldots, [o_n, \lambda^0, (o_n, T)], \Lambda_1=\{[o_0, \lambda_1, (o_0, T)], \ldots, [o_n, \lambda_1, (o_n, T)]\}$, and $\forall o_q\epsilon\Omega)(M_0(o_q)=M_1(o_q))$. Thus, the two models are equivalent only when defined over the same set of tokens. The same methodology is frequently used in mathematics when different constructs defined over the same set of primitives are shown to be equivalent under specific operations. As a practical matter, fixing the set of tokens ensures that comparisons of different models are meaningful only when made with respect to one universe over the same inputs.

Let $M=[\Omega,\Lambda,T,\lambda,\omega,\sigma,\rho]$ be a semantic network retrieval model. The set $\Lambda$ consists of objects each of which is a node in a directed graph G with two types of arcs: isa and partof. An isa-arc denotes the subclass-superclass relationship between the nodes it connects; a partof-arcs denotes the part-whole relationship between the nodes. While some semantic networks introduce additional relations, isa and partof have become the standard for abstraction and packaging. Let $A_0$ be the $|\Lambda|\times|\Lambda|$ matrix such that $A_0[i, j]=1$ if there is an isa-arc from $o_i\epsilon\cdot\Lambda$ and $0_j\epsilon\Lambda$, and $A_0[i, j]=0$, if there is no such arc. Let $A_1$ be a similar matrix for the partof-relationship. An object $0_i$ abstracts an object $0_j$ iff G has a path of isa-arcs from $o_j$ to $o_i$. When $o_i$ abstracts $o_j$, $o_i$ is an abstraction of $o_j$. An object $o_i$ specializes an object $o_j$ iff G has a path of isa-arcs from $o_i$ to $o_j$. Thus, $o_i$ abstracts $o_j$ iff $o_j$ specializes $o_i$. Any object both abstracts and specializes itself.

Associated with each node is a single set of labels. A label $[\chi]=[e_o, \ldots, e_n]$ is a sequence of elements such that for all i, $0\leq i\leq n$, $e_i\epsilon T\cup I$. Thus, labels may contain not only tokens but also object ids. If $o_i\epsilon\Omega$, then $X_i$ is the set of labels associated with $o_i$. If $o_i\epsilon\Lambda$, and $[\chi]_i=[e_o, \ldots, e_n]$, $\epsilon X_i$, $g(o_i, [\chi]_i)=[\omega(e_o,o_i), \ldots, \omega(e_n,o_i)]$, i.e., g: $\Lambda\times[T\cup I]\rightarrow[R]$. An expectation is a 3-tuple $[o_i, [\chi]_i, [v]]$ such that $[\chi]_i=[v]_k+[v]_j$. For example, if $[\chi]_1=[0, 1, 2]$, then $[o_i, [\chi]_i, [1,2]]$, $[o_i, [\chi]i, [2]]$, and $[o_i, [\chi]_i, [\;]]$ are expectations. Intuitively, an expectation reflects how completed a label is with respect to an object. If $z=[o_i, [\chi]_i, [v]_j]$, then $eobj(z)=o_i$, $eseq(z)=[\chi]_i$, $ecseq(z)=[v]_j$, and $key(z)=headecseq(z))$.

Put $\lambda(o_i, T)=[X_i, L_0, L_1]$, where $X_i$, is the set of labels associated with $o_i$, $L_0=\{o_j|o_j\epsilon\Lambda\Lambda A_0[i, j]=1\}$, and $L_1=\{o_j|o_j\epsilon\Lambda\Lambda A_0[i, j]=1\}$. Note that $L_0$ and $L_1$ can be empty. For example, if $o_q\epsilon\Omega-\Lambda$, $\lambda(o_q, T)=[X_q, \{\;\}, \{\;\}]$. Let $O_i\epsilon\Omega$ and $o_i\epsilon\Lambda$ and let f: $[R]\times[R]\rightarrow R$. The object similarity between $o_i$ and $o_q$ is $\sigma(o_i,o_q)=max\{f(g(o_i[\chi]_i),g(o_q[\chi]_q))\}$, where $[\chi]_i\epsilon X_i$, $[\chi]_q\epsilon X_q$, and $[\chi]_q$ completes $[\chi]_i$. In the maximization, the ranges of i and q in $[\chi]_i$ and $[\chi]_q$ are $0\leq i\leq|X_i|$ and $0\leq q\leq|X_q|$. An object $o_q$ activates an object $o_i$ iff there exists a label $[\chi]_q\epsilon X_q$ and a label $[\chi]_i\epsilon X_i$ such that $[\chi]_q$ completes $[\chi]_i$. If there is no $[\chi]_i\epsilon X_i$ such that $[\chi]_q$ completes $[\chi]_i$, then $\sigma(o_i, o_q)=0$. This formalization of spreading activation both generalizes and makes rigorous the node activation sequence approach. It also subsumes the spreading activation level approach and the activation path shape approach. The former is subsumed insomuch as the activation level of a node becomes a function of $\sigma$'s values. The latter is subsumed insomuch as the node activation paths are determined by object ids in labels. An algorithm for retrieving nodes by spreading activation is given below.

Let M be a semantic network retrieval model. Let o be an input object with X as its set of labels. T is a table mapping the id's of objects in $\Lambda$ to the scores representing their similarity with the query object, i.e., reals. Initially, T maps each id to 0. Let V be the vector representation of T, i.e., $V=[[o_o, s_o], \ldots, [o_n, s_n]]$, where $[o_i\epsilon\Lambda]\hat{\;}\{s_i=\sigma(o, o_i)\}$ for all $i\leq i\leq n$. Let E be a table mapping expectations to tokens. If e is an expectation, then key(e, E) denotes the token to which E maps e. The retrieve procedure returns M(o). The spread procedure activates nodes with at least one completed sequence.

```
 0 procedure retrieve(o, M, T)
 1   for each [s] in X
 2     T=spread(o, [s], T);
 3   convert T to V;
 4   sort V's entries by similarity
 5     in non-increasing order;
 6   sort V's entries with equal similarity
 7     by id in increasing order;
 8   return the sequence of ids as they occur
 9     in V from left to right;
10 procedure spread(o, [s], T)
11   w=g([s],o)
12   for each e in [s]
13     activate(e, T, w);
14   return T;
15 procedure activate(e, T, w)
16   for each abstraction a of e
17     for each expectation e keyed on a
18       advance(e, T, w);
19 procedure advance(x, T, w)
20   if null(ecseq(x))
21   then
22     y=f(w, g(eseq(x), eobj(x)));
23     if(T[eobj(x)]<y)
24     then T[eobj(x)]=y;
25     activate(eobj(x));
26   else
27     [v]=tail(ecseq(x));
28     ne=newexp(eobj(x), eseq(x), [v]);
29     key(ne, E)=head([v]);
30 procedure newexp(o, [x], [v])
31   return a new expectation [o, [x], [v]]
```

As can be seen, the integration of document processing, query generation and feedback in an application-embedded distributed IR system provides unique advantages over existing systems. Automatic generation of queries from free-text documents enables users to retrieve relevant information without disrupting their routine document processing activities. Consequently, the retrieval of relevant information becomes a by-product of document processing. Customized information retrieval and feedback are possible through the incorporation of a user profile database 108. Through the feedback feature of the retrieval manager 118, the user can control the frequency and content of retrieved information to suit a particular document or application.

The presently preferred embodiment embeds the features and functions of the invention in a text processor environment, but other application programs such as spread sheet, database and graphical programs can readily benefit from the unique aspects of the invention. These benefits include a non-intrusive, feedback-sensitive IR system that integrates document processing with simultaneous retrieval of relevant information. Users can use the system to automatically tap into information sources while still engaged in routine usage of the underlying application program. In an alternate embodiment, input files such as documents can be scanned into the system. The unique semantic network processor program provides the advantage of automatically generating structured queries from free-text documents in a term-independent way, thus allowing the retrieval of documents similar in content, but not necessarily similar in the way that content is described.

It is to be understood that a wide range of changes and modifications to the embodiments described above will be apparent to those skilled in the art, and are contemplated. It is therefore intended that the foregoing detailed description be regarded as illustrative, rather than limiting, and that it be understood that it is the following claims, including all equivalents, that are intended to define the spirit and scope of the invention.

I claim:

1. An embedded distributed information retrieval system, comprising:

an embedding module for embedding a distributed information retrieval system in a computer application program, the embedding module being operative to enable a user to select at least one information source and at least one knowledge base;

a free-text parser coupled to the application program, the free-text parser operative to receive scheduled reads of textual information from the application program, parse the textual information into sentences, and rank the sentences on the basis of words and phrases in the sentences;

a query engine coupled to receive the ranked sentences, and operative to generate structured queries, the query engine coupled to the at least one knowledge base and including a semantic network processor program;

a metasearch engine coupled to receive and submit the structured queries to the at least one information source; and a retrieval manager coupled to the metasearch engine, the retrieval manager operative to receive retrieved links associated with the structured queries, and to rank and filter the retrieved links based upon predefined criteria.

2. The system defined in claim 1, wherein the predefined criteria comprise relevancy to the inputted textual information.

3. The system defined in claim 1, wherein the at least one knowledge base comprises a semantic network of concepts organized in terms of abstraction and packaging relations.

4. The system defined in claim 1, wherein the semantic network comprises a knowledge base of concepts connected via hierarchical and packaging relations.

5. The system defined in claim 1, wherein the at least one information source comprises a proprietary database.

6. The system defined in claim 1, wherein the at least one information source comprises the Internet.

7. The system defined in claim 1, wherein the sentences are ranked in terms of their content-bearing capacities.

8. The invention of claim 1, wherein the metasearch engine is further operative to submit the structured queries to a plurality of distributed information sources.

9. An embedded distributed information retrieval method for generating structured queries, comprising:

(a) receiving an input from a user that indicates the user's selection of at least one information source;

(b) receiving scheduled reads of textual information;

(c) parsing the textual information into sentences;

(d) parsing the sentences into words and phrases;

(e) ranking sentences by their content-bearing capacities based on their weighted words and phrases;

(f) generating structured queries from the ranked sentences using a semantic network processor program;

(g) submitting the structured queries to the at least one information source;

(h) receiving retrieved links associated with the structured queries; and (i) ranking and filtering the retrieved links based upon predefined criteria.

10. The method defined in claim 9, wherein the predefined criteria comprise relevancy to the inputted textual information.

11. The method defined in claim 9, further comprising searching the information source in response to the structured queries.

12. The method defined in claim 11, wherein searching the information source further comprises searching a proprietary database or a search portal.

13. The method defined in claim 11, wherein searching the information source further comprises searching the Internet.

14. The method defined in claim 9, further comprising providing a metasearch engine to receive and submit the structured queries to the at least one information source.

15. The method defined in claim 14, wherein the semantic network program provides its output as input to the metasearch engine.

16. The method defined in claim 9, wherein (f) further comprises using the semantic network processor program to spread activation that maps free-text inputs to relevant concepts in a knowledge base.

17. The invention of claim 9, wherein (g) comprises submitting the structured queries to a plurality of distributed information sources.

* * * * *